May 10, 1966  J. W. GREIG ETAL  3,250,660
DIE APPARATUS FOR FORMING HOLLOW PLASTIC STRUCTURE
Filed Dec. 12, 1961  2 Sheets-Sheet 1
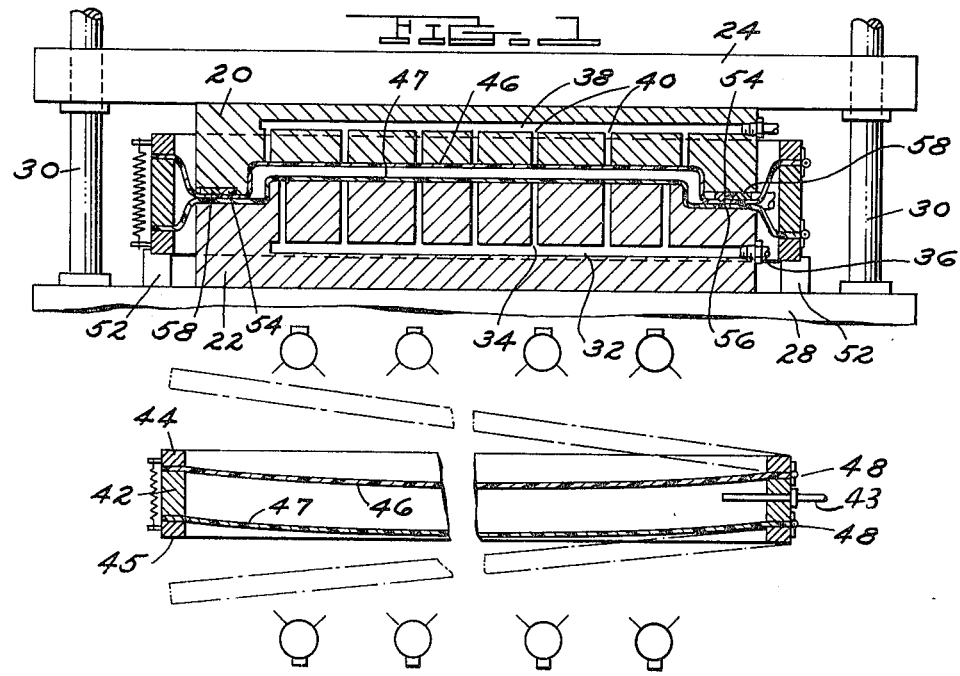
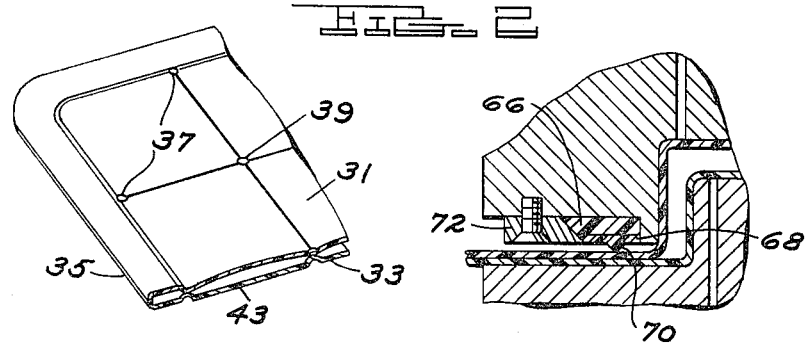
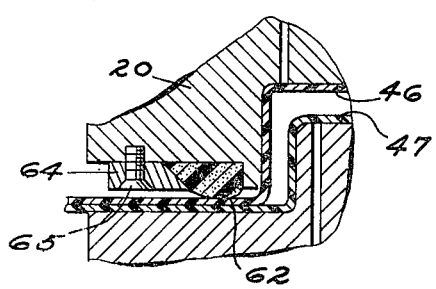
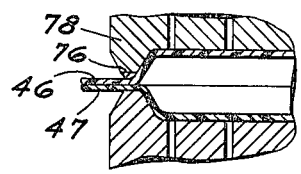
INVENTORS
JAMES W. GREIG
MARVIN H. CUNNINGHAM
BY Burton & Parker
ATTORNEYS

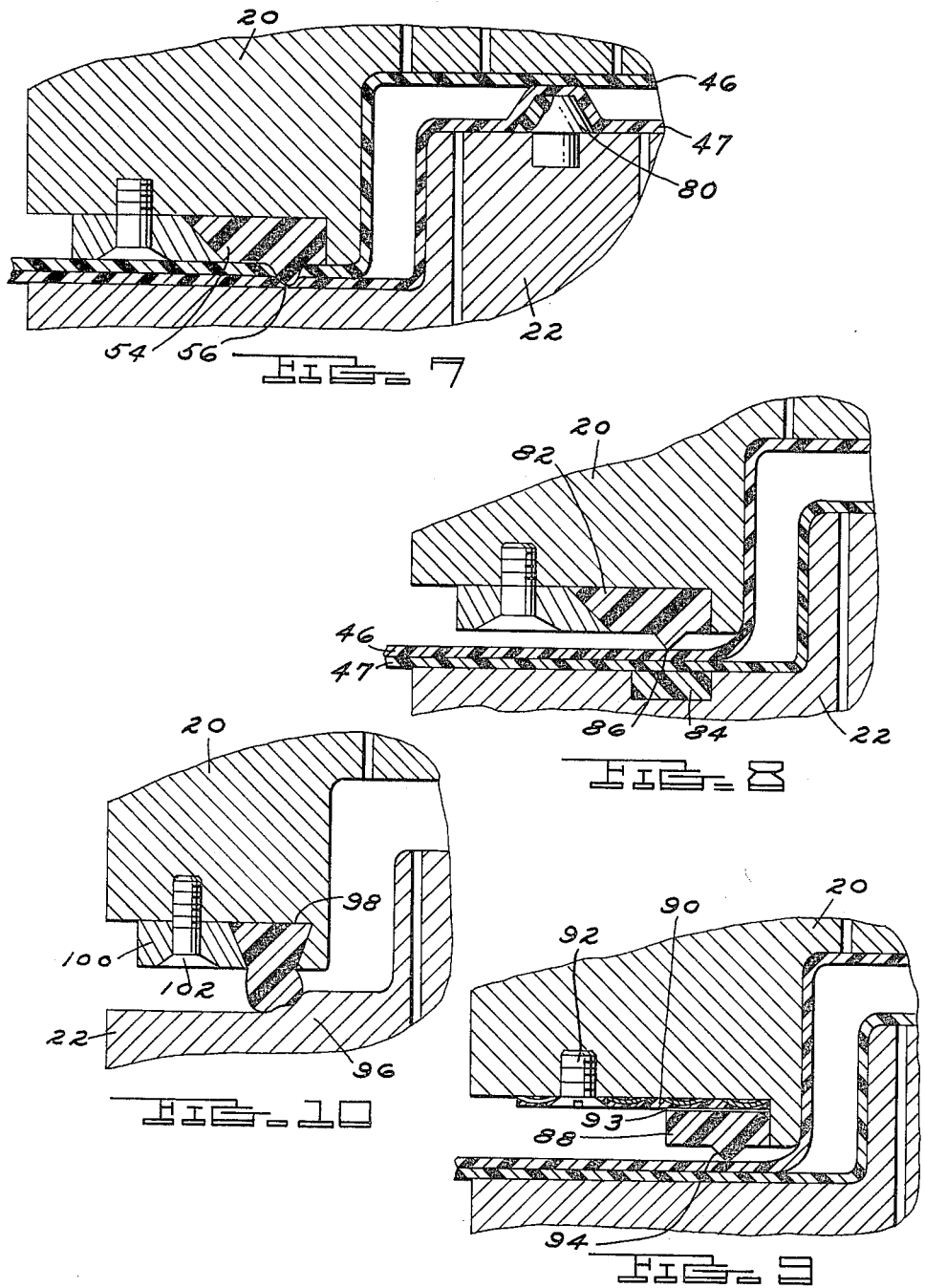

United States Patent Office 3,250,660
Patented May 10, 1966

3,250,660
DIE APPARATUS FOR FORMING HOLLOW
PLASTIC STRUCTURE
James W. Greig, Grosse Pointe Park, Mich., and Marvin
H. Cunningham, Lebanon, Ohio, assignors to Woodall
Industries, Incorporated, Detroit, Mich., a corporation
of Michigan
Filed Dec. 12, 1961, Ser. No. 158,700
6 Claims. (Cl. 156—581)

This invention relates to an improved die assembly for fabricating hollow plastic structural forms from two plastic sheets and to improvements in the die members of said assembly, and to an improved process of forming the die face of one or both of said die members.

This application is a continuation in part of our application Serial No. 69,521, filed November 15, 1960.

An object of this invention is the provision of a die assembly comprising a pair of cooperating die members and means for supporting two heated plastic sheets in spaced-apart parallelism between said die members to be acted upon thereby, whereby the sheets may be shaped throughout selected areas and sealed together throughout a determined area or at determined points to form a hollow plastic structural shape having a determined contour and/or surface configuration.

Another object is the provision of a die assembly of the character described provided with means for suitably supporting two heated plastic sheets in spaced-apart substantial parallelism between the two relatively shiftable die members, to be acted upon by said die members to be sealed together therebetween to form a hollow plastic walled structure, and wherein means is provided to draw or urge determined areas of individual sheets against the working faces of the die members to shape the sheets during the fabrication of the plastic hollow structure.

More specifically the die assembly includes a plastic sheet carrying frame which is adapted to support two plastic sheets in spaced substantial parallelism for heating and for shaping and sealing between the die members to form therefrom a hollow plastic structure. The frame may be used to support the sheets for heating to the desired temperautre. The frame carrying the sheets may then be disposed between the dies to support the sheets to be acted upon by the dies to shape the sheets, to seal the sheets together and to form the hollow structural shape.

Another object is the provision of a die assembly whereby the two heat and pressure responsive plastic sheets which are used to make up the hollow structure may be sealed together at determined points or throughout determined areas or along a determined boundary line and such may be accomplished rapidly and effectively. In accomplishing this shaping and sealing together of the two sheets, the die members, including their working faces, are formed largely of good heat-conductive material such as metal. This is adapted to conduct heat away from the plastic sheets being sealed together between the die members with sufficient rapidity to speed up the forming and sealing operation. The dies are also so formed as to retain sufficient heat within those areas of the sheets to be sealed together to obtain an effective seal between such areas.

To effectuate the object set forth immediately hereinabove and obtain a good heat seal between the sheets, it is necessary that the sheets at the point of heat sealing be held together in a heat fusible state for a sufficient period of time to completely seal them together. It is therefore important that the two sheets at the point of sealing together are not cooled so rapidly as to interfere with completion of the sealing. We accomplish this by forming the heat-sealing areas of one or both dies of material which is not so highly heat-conductive as to cool the adjacent sheet areas being sealed together too quickly, but permits the plastic sheets to retain their heat at the point of seal until an effective seal is accomplished.

A meritorious feature is that while the die faces are provided with sealing areas which will not conduct the heat away from the sheets too rapidly these low conductive sealing areas are surrounded or lie adjacent to high heat-conductive die face areas so that generally the sheet is rapidly cooled in order that the die forming operations may proceed rapidly.

Another meritorious feature is that the working die face of one or both die members may be provided with heat sealing areas in the form of projecting ridges or tapered projecting parts which are relatively compressible so that the edge or point of this heat sealing die area flattens upon pressure thereagainst and increases the area of sheet sealing.

A further meritorious feature is that the dies may be so formed that the sheets are sealed together throughout a boundary line of narrow width which encircles a relatively large central expanse of the sheet throughout which expanse the two sheets may each be shaped and contoured and sealed together only at spaced points.

Another object is the provision of a die assembly of the character specified wherein one die member may have its working face predetermined and contoured in a desired manner. Such die face may be wholly or in part metal. The working face of the second and cooperating die member may be formed generally of metal to substantially but not exact mating contour with the working face of the first die member. Such working face of the second die member may then be built up of deformable material such as a thermosetting resin. This resin build up conforms only generally with the contour of the working face of the first die member and is given its final shape through pressure contact and cure against the preformed working face of the first die member. This method of forming the working face of the second die member eliminates the necessity of independently and meticulously shaping the cooperating faces of the two die members into mating engagement. The precise mating engagement where provided in part by the deformable resin can be quickly accomplished.

The apparatus lends itself to the formation of many different structural shapes as more particularly set forth in our application on the process, Serial No. 69,521 supra.

Other objects, advantages and meritorious features will more fully appear from the following specification, claims and accompanying drawings, wherein:

FIG. 1 is a cross-sectional view through a die mechanism, partly broken away, within which plastic sheets carried by the frame shown in FIG. 2 may be acted upon;

FIG. 2 is a cross-sectional view through a frame adapted to support two plastic sheets for shaping and sealing together within the die mechanism as shown in FIG. 1;

FIG. 3 is a perspective of a fragment of a hollow plastic panel such as might be formed in the apparatus herein disclosed;

FIG. 4 is a fragmentary enlarged cross-sectional view through the hold down portions of two cooperating dies and being a slight modification of the structure as shown in FIG. 1;

FIG. 5 is a fragmentary cross-sectional view through two cooperating dies being a modification as compared with the structure of FIG. 4;

FIG. 6 is a fragmentary cross-sectional view through two cooperating dies similar to FIG. 1 but of a slightly varying form;

FIG. 7 is a fragmentary cross-sectional view through a pair of cooperating dies showing a structure similar to FIG. 1 but showing an additional sealing within the central area surrounded by the sealed boundary line;

FIGS. 8 and 9 are fragmentary cross-sectional views through a pair of cooperating dies showing slight modifications of heat sealing portions of the dies; and FIG. 10 is a fragmentary cross-sectional view showing the method of shaping a portion of the upper die to conform with a preformed portion of the lower die.

FIG. 1 shows a cross-sectional view through a conventional press assembly wherein are mounted my improved die elements 20 and 22. The upper die element 20 is carried by the upper frame or force member 24 which is supported by means not shown for raising or lowering. The lower die element 22 is carried by a base 28 which is provided with vertical guide pins 30 to guide the travel of the force 24 toward or away from the lower die.

The lower die element 22 has a fluid passageway 32 provided with a plurality of branch lines 34 leading to different areas of the face of the die member. This passageway 32 may lead as from a broken away end portion 36 to a vacuum source or place for air exhaust or even a source of suitable high fluid pressure not shown, and whichever is desired. The upper die member 20 is provided with a fluid passageway 38 having branches 40 leading to different areas of the face of such die member for the same purpose hereinabove described with respect to fluid pressure lines 32 of the lower die member.

To support two heated plastic sheets between the die members to be acted upon thereby there is provided a sheet supporting frame as shown particularly in FIG. 2. This consists of an intermediate frame member 42 provided with a fluid line 43 therethrough and two outer frame members 44 and 45 hinged to frame member 42 along on side as at 48. Two plastic sheets 46 and 47 may be gripped between the frame members to be supported in substantial spaced parallelism. As shown in solid line in FIG. 2 the sheets have been heated and have sagged as a result of such heating. A releasable spring catch arrangement 50 may be provided to hold the outer swingable frames 44 and 45 toward the intermediate frame member 42 gripping the plastic sheets so as to secure them in stretched spaced-apart relationship between the three frame members.

Normally these sheets would be held spaced apart the distance indicated by the thickness of the inner frame member 42. In FIG. 1 they are shown as being acted upon by the die elements and therefore throughout their interior they are being held toward each other only at selected points by sealing areas of the die elements. This plastic sheet-carrying frame is shown in FIG. 1 as removably mounted upon a ledge of wall 52 so as to support the plastic sheets properly disposed between the two die members.

The plastic sheets may be formed of suitable heat formable and heat sealable plastic compositions such as polyethylene or as described in our application Serial No. 69,521 supra. The sheets may be heated to the desired temperature while supported within the frame and then the frame, carrying such heated sheets, may be disposed within the die mechanism as shown.

In FIG. 1 the die members 20 and 22 are shown as hereinabove described in connection with the description of FIG. 1 with the two plastic sheets 46 and 47 gripped therebetween. These die members would normally be formed of metal. Such is indicated by the cross hatching. However certain portions of one or both die members may be formed of material of low heat conductivity such as plastic, as hereinafter described.

Die member 20 is shown as provided with a marginal or boundary heat sealing part or ridge 54 which may be formed of a suitable thermosetting resin composition. Such resin composition possesses some elasticity or compressibility and is of a low heat conducting character. The metal of the major portion of the die is a high heat conductor as is desirable to carry the heat away from the plastic sheets rapidly after they have been shaped and sealed together. This low heat conductive heat sealing element 54 is shown as provided with a projecting tapered ridge portion 56 (FIG. 1) which contacts the adjacent plastic sheet and urges it toward the companion plastic sheet. This boundary element 54 and its ridge 56 extend normally around the entire circumference of the central area of the die and is held in place by a retainer strip 58. This strip may be secured by screws or the like to the die face as shown in FIGS. 4 and 5.

The purpose of providing this boundary heat sealing strip of relatively low heat conductivity as compared with the high heat conductivity of the metal part of the die is to ensure that heat will not be drawn away from the plastic sheets right along the boundary line of sealing together so rapidly as to prevent the formation of an effective seal along such line of sealing. The low heat conductive character of the thermosetting resinous composition 54 prevents this from happening. Such low heat conductive composition may be any suitable thermosetting resin or the like such as an epoxy resin.

FIG. 3 illustrates in perspective a fragment of a panel such as an automobile interior trim panel which is described in detail in our application Serial No. 69,521 supra. There is an upper plastic sheet 31 and a lower plastic sheet 33. These two sheets are heat sealed together about their opposed margins as at 35 forming a hollow plastic structure. They may be further heat sealed together along a parallel inner boundary line but at spaced points only as at 37. These two sheets may be further heat sealed together at spaced points 39 forming block shaped upholstery appearing embossments 41. The lower plastic sheet may be debossed as at 43 as more particularly described in such co-pending application supra.

FIG. 4 shows a die arrangement similar to that shown in FIG. 1 except that the heat sealing boundary strip identified as 62 (FIG. 4) is of a somewhat different shape from that shown in FIG. 1 and there identified as 54. The boundary sealing strip 62 seals along a relatively wide boundary line. It is held in place by a retainer strip 64 secured to the die face by screws 65.

In FIG. 5 there is a slightly modified form of relatively low heat conductive sealing element. It is shown as having a base portion 66 and a face portion 68. The face portion 68 is provided with the ridge 70 which corresponds with the ridge 56 of the element 54 in FIG. 2. Retainer strip 72 held in place by screws 74 overhangs and holds in place the heat sealing strip as shown in FIG. 5. This heat sealing relatively low heat conducting material is somewhat compressible and resilient. In FIG. 5 the base portion 66 is shown as formed of a material which has a different compressibility factor as compared with the face portion 68. The base portion 66 may be formed of a material which is relatively more readily compressible than the face portion 68.

In FIG. 6 there is illustrated a plastic low heat conductive sealing nose portion 76 secured to a ridge or boundary part of the upper die indicated as 78. This nose portion 76 is of the character heretofore described in connection with the portions 54 and 62 of FIGS. 1 and 4.

In FIG. 7 the construction is similar to that shown in FIG. 1, however in addition to the upper die 20 being provided with the low heat conductive sealing boundary strip 54, the lower die 22 is shown as provided with a low heat conductive sealing point or plug 80. Such heat sealing plugs may be provided in number, shape and spacing as desired to seal the two sheets together. They form point area seals as shown in FIG. 3 at 37 and 39. This plug 80 may be formed of the same material as the heat sealing element 54.

In FIG. 8 the upper die 20 is shown as provided with a low heat conductive sealing element 78 and the lower die 22 is shown as provided with an opposed low heat conductive sealing element 84. These elements are disposed on opposite sides of the two sheets 46 and 47 whereby heat is retained in both sheets along the line of seal.

FIG. 9 illustrates another modified form of heat sealing element 88 as compared with the one shown in FIGS. 7 and 8. The heat sealing element 88 is shown as carried by a metal or plastic base strip 90 which in turn may be adhesively secured or secured by screws 92 to the upper die member 20. The sealing element 88 may be adhesively secured as at 93 to its base strip 90. It may be provided with a ridge 94 as hereinabove described. This heat sealing element 88 would be of the same low heat conductivity as heretofore described in connection with corresponding heat sealing parts in the other figures of the drawings.

In FIG. 10 the lower die 22 is shown as having a preformed die face portion at 96. Such may be of metal or the like. The upper die 20 is shown as provided with a thermosetting plastic heat sealing ridge element 98 secured in place by retainer strip 100 held by screws 102. The element 98 is formed of thermosetting resin composition such as heretofore set forth. Such resin composition may be mounted upon the die face and secured in place while in the uncured state. This is before the resin sealing element has been cured and it only generally conforms in shape to the preformed opposed face portion of the opposed die. The final shape of this resin sealing portion 98 is determined by urging the two die members directly together as shown in FIG. 10. The thermosetting resin ridge 98 of the upper die is thus shaped to its mating contour with the portion 96 of the lower die and held thereagainst until it cures at such shape. This provides a simple method for providing a mating face portion on one die which conforms to a preshaped or predetermined portion of the other die without the necessity of independently laboriously contouring the mating face portion of one die to agree with the corresponding portion of the other die.

What we claim is:

1. A stamping assembly comprising, in combination, a pair of cooperating die members supported to be moved toward and away from each other, a sheet carrying and clamping frame removably supported between said die members, said frame comprising cooperating frame members coupled together to be moved apart to receive therebetween in spaced relationship two plastic sheets; means operable to hold said frame members together to grip and support therebetween two heated plastic sheets in spaced-apart substantial parallelism said die members having associated therewith means adapted to support said frame with spaced opposed areas of said sheets surrounded by said frame disposed between said two die members in the line of movement of said die members relative to each other whereby opposed areas of said sheets are urged and sealed together at predetermined points within the boundary of said frame mechanism operable to create a differential in air pressure within the space between the two plastic sheets and the outer faces of the sheets opposed to the working faces of the die members to cause opposed areas of the sheets within the frame to be held apart and against the faces of the die members to form a hollow plastic structure.

2. Stamping mechanism as defined in claim 1 characterized in that said frame comprises three cooperating frame members, one being an intermediate frame member and the other two being complementary outer frame members shaped to cooperate with opposed edges of the intermediate frame member to grip a plastic sheet between each outer frame member and the adjacent edge of the intermediate frame member, said intermediate frame member provided with a fluid communication passageway extending therethrough placing the space between the two sheets within the frame in communication with a space outside of the frame.

3. Stamping mechanism as defined in claim 1 characterized in that a fluid communication passageway is provided through one of the die members placing the space between the face of said die member and the adjacent plastic sheet supported by the frame in communication with a space exterior thereto.

4. Stamping mechanism defined as in claim 1 characterized in that a frame support is provided outwardly beyond said die members to removably support the frame to support the plastic sheets carried by the frame extending across and between said die members.

5. A pair of cooperating die members adapted for use in the stamping of plastic sheets as defined in claim 1 characterized in that at least one of said die members is provided with a vacuum line extending thereinto and having a plurality of outlets opening through the working face of the die member to subject the adjacent face of the plastic sheet disposed thereagainst to suction adapted to draw said sheet against said die face.

6. A pair of cooperating die members adapted for use in the stamping of plastic sheets as defined in claim 5 characterized in that the thermosetting mating area of its member is shaped to its final mating form by pressure contact before curing of the thermosetting plastic by pressure contact with the cooperating opposed area of the other die member.

References Cited by the Examiner

UNITED STATES PATENTS

| 2,303,198 | 11/1942 | Cunnington | 156—581 |
| 2,474,035 | 6/1949 | Crandon | 156—285 |
| 2,679,469 | 5/1954 | Bedford | 156—272 X |
| 2,715,087 | 8/1955 | Barradas | 156—580 X |
| 2,767,769 | 10/1956 | Hasselquist | 156—581 |
| 3,047,451 | 7/1962 | Beck et al. | 156—219 |

EARL M. BERGERT, *Primary Examiner.*

D. J. DRUMMOND, *Assistant Examiner.*